United States Patent [19]

Dory

[11] 4,340,944
[45] Jul. 20, 1982

[54] ULTRASONIC ECHOGRAPHIC PROBE HAVING AN ACOUSTIC LENS AND AN ECHOGRAPH INCORPORATING SAID PROBE

[75] Inventor: Jacques Dory, Villenoy-les-Meaux, France

[73] Assignee: CGR Ultrasonic, Villenoy-les-Meaux, France

[21] Appl. No.: 241,111

[22] Filed: Mar. 6, 1981

[30] Foreign Application Priority Data

Mar. 7, 1980 [FR] France ............................. 80 05200

[51] Int. Cl.³ .............................................. G01S 15/89
[52] U.S. Cl. ........................................ 367/96; 73/642; 310/335; 367/103; 367/150
[58] Field of Search ................... 367/95, 96, 103, 150, 367/902; 73/642; 310/335; 128/660

[56] References Cited

U.S. PATENT DOCUMENTS

| | | | |
|---|---|---|---|
| 2,743,429 | 4/1956 | Erdman et al. | 367/95 |
| 3,168,659 | 2/1965 | Bayre et al. | 367/150 X |
| 3,239,801 | 3/1966 | McGaughey | 367/150 |
| 3,776,361 | 12/1973 | Rolle | 367/150 |
| 4,084,582 | 4/1978 | Nigam | 367/150 X |
| 4,199,246 | 4/1980 | Muggli | 367/96 X |

FOREIGN PATENT DOCUMENTS 179076 4/1966 U.S.S.R. ............................. 73/642

*Primary Examiner*—Richard A. Farley
*Attorney, Agent, or Firm*—Cushman, Darby & Cushman

[57] ABSTRACT

A probe primarily applicable to medical echography for achieving a variable compromise between depth of field and lateral resolution incorporates a main piezoelectric transducer, a plano-convex lens having an elastic diaphragm, an auxiliary transducer for measuring the deflection of the lens and means for controlling the deflection in dependence on a reference value by modifying the pressure exerted on the diaphragm by the fluid contained within the lens.

7 Claims, 2 Drawing Figures

ULTRASONIC ECHOGRAPHIC PROBE HAVING AN ACOUSTIC LENS AND AN ECHOGRAPH INCORPORATING SAID PROBE

This invention relates to an ultrasonic echographic probe having a deformable acoustic lens and further relates to an echograph comprising a probe of this type.

In the prior art, it was a common practice to employ probes having a fixed focus obtained by providing a cup-shaped piezoelectric transducer which constitutes the transmitter-receiver element of the probe, or alternatively by associating an acoustic lens with a flat piezoelectric transducer. In this technique, the depth of field must necessarily be of relatively substantial value in order to obtain a sufficiently large area of scanned surface. In echography, the image is in fact formed from points of the object located in a plane which passes through the line-of-sight. This makes it necessary to make use of a relatively small numerical aperture and this results in a relatively large focal spot.

Moreover, in the event that the acoustic lens employed is of the type consisting of a chamber containing a liquid and having one deformable face, the focal distance is not known with accuracy and any adjustments performed are both difficult and very unstable, especially by reason of the leakages of liquid and of the effects of temperature on the volume of liquid.

Another known technique consists in the use of annular probes having multiple transducer elements for adjusting the focus by introducing variable and different time-delays between each element and the transmitting and receiving circuits. This technique forms the subject of French Pat. No. 73 41921 filed by the present Applicant on Nov. 22nd, 1973 in respect of: "Apparatus for sounding by acoustic pulses with variable focusing of the sounding beam".

The technology of probes of this type becomes very difficult as soon as it is desired to obtain large numerical apertures since the number of annular elements increases as a function of the numerical aperture desired and mechanical decoupling between the elements rapidly becomes very difficult to achieve whilst the time-delays have to increase to considerable values.

A first aim of the invention is to provide a probe having a deformable acoustic lens, the focal distance of which can be adjusted with precision over a wide range and maintained at stable values.

To this end, the probe in accordance with the invention comprises and is characterized by means for varying the pressure of liquid on the diaphragm as a function of a control signal; an electroacoustic means for measuring the thickness of the lens by reflection of ultrasonic pulses; and a means for comparing the thickness-measuring signal generated by said electroacoustic means with a signal which is representative of a reference value in order to generate a difference signal which constitutes said control signal.

A further aim of the invention is to provide a probe having a very large numerical aperture and adjustable focus for achieving the best possible compromise between the depth of field and the lateral resolution.

In a preferred mode of construction, a probe of this type is characterized in that the main transducer comprises a plurality of piezoelectric elements which are electrically insulated and acoustically independent from each other, said elements being associated so as to form a common active surface which constitutes the first face of the lens. The main receiver associated with said transducer is connected to its different elements by means of phase and amplitude weighting circuits which are adjustable independently of each other, means being provided for carrying out the programmed adjustment of these circuits and of said reference value.

Other features of the invention will be more apparent upon consideration of the following description and accompanying drawings, wherein.

Figure 1:
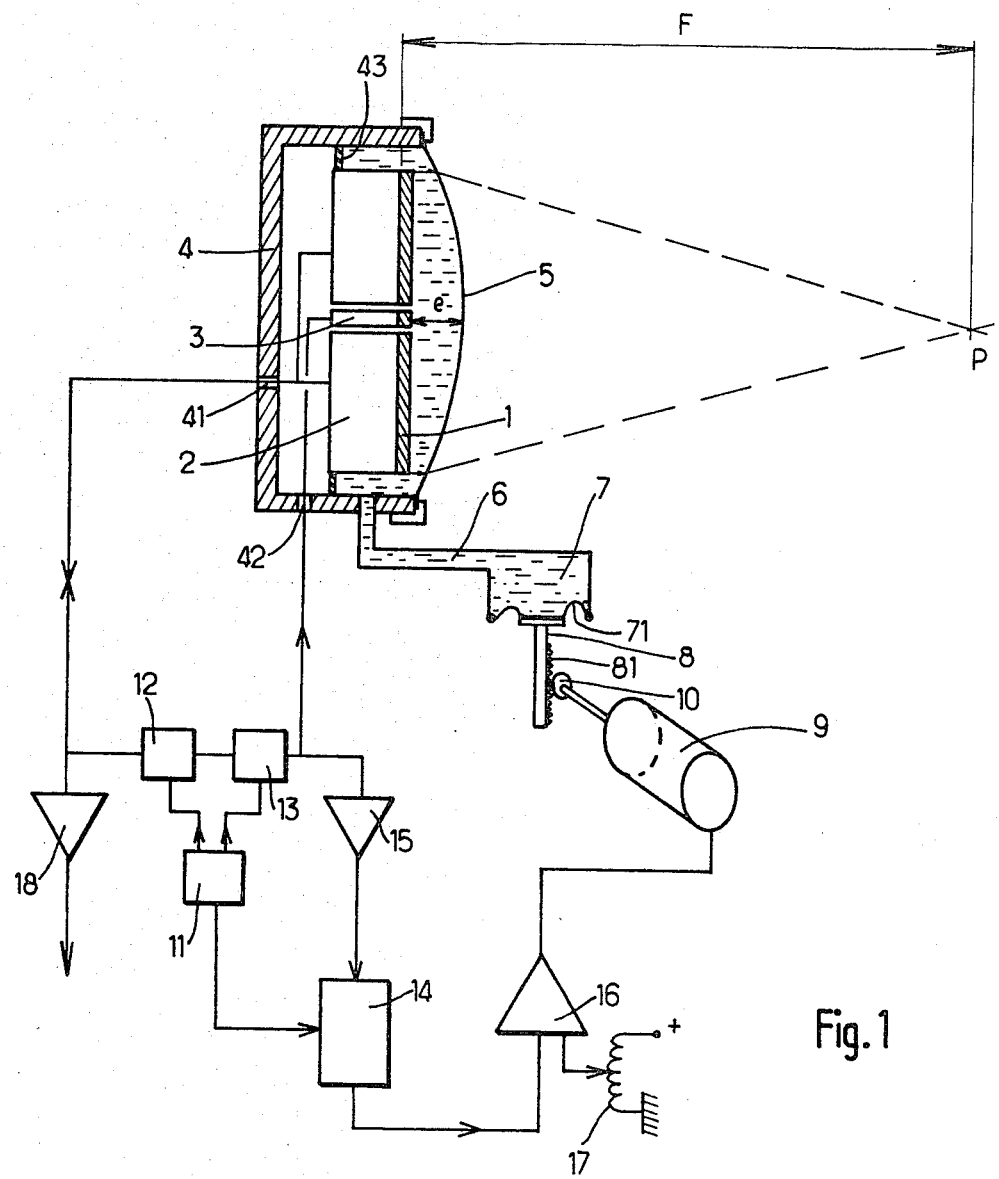
FIG. 1 is a schematic illustration of an echography device which makes use of a probe in accordance with a first embodiment of the invention.

The acoustic probe shown in FIG. 1 is constituted by an annular ceramic transducer 1 rigidly fixed to an annular block 2, the intended function of which is to damp the ultrasonic oscillations emitted by the transducer. The cylindrical cavity which is common to the two concentric annular elements 1 and 2 houses an auxiliary ceramic transducer 3. The assembly is mounted within a casing 4, the rear wall of which is provided with orifices 41, 42 through which are passed conductors for providing a connection with the circuits of the device. The front wall of the casing 4 is constituted by an elastic diaphragm 5 which is transparent to ultrasonic waves. The front portion of the casing up to a seal 43 is filled with a liquid in which the ultrasonic waves propagate at a velocity $C_1$ which is different from the propagation velocity within the external medium. Between the emission surface of the transducers 1 and 3 and the surface of the diaphragm 5, the aforementioned liquid forms a deformable lens which is of the plano-convex type in the embodiment described. Assuming that $C_1 < C_2$, the beams emitted by the two respective transducers are thus focused at a point P which is located at a distance F from the plane of the emitting surfaces.

The front portion of the casing 4 is connected by means of a duct 6 to a capsule 7 terminating in an elastic diaphragm 71. A piston 8 driven by an electric motor 9 produces action on said diaphragm by means of a toothed wheel 10 engaged with a toothed rack 81 with which the piston rod is provided.

The electric circuits of the device comprise: a clock generator 11 which synchronizes two pulse transmitters 12 and 13 and a measuring circuit 14.

The transmitter 13 excites the transducer 3 and the echos obtained after reflection of the emitted ultrasonic waves from the diaphragm 5 are directed to an amplifier 15 and transmitted by this latter to the measuring circuit 14. A direct-current voltage delivered by said measuring circuit is proportional to the time interval which elapses between emission of the pulse by the transducer 3 and reflection of said pulse from the diaphragm, therefore to the distance e between the emission plane and the center at the apex of the diaphragm.

The construction of the measuring circuit 14 is within the capacity of anyone versed in the art. By way of example, this circuit can comprise a sawtooth voltage generator, the beginning of the ramp of each sawtooth being synchronized with the reception of the echo (amplifier 15); and a peak detector delivers the peak voltage of the ramp which is proportional to its timeduration.

The output of the circuit 14 is connected to one input of a differential amplifier 16, the other input of which receives a direct-current reference voltage delivered by a potentiometer 17. The difference voltage which appears at the output of the differential amplifier 16 controls the motor 9 which is adapted in a manner known per se to carry out a rotation having an amplitude which is proportional to the control voltage and in a direction which depends on the sign of said voltage.

The displacement of the piston in either one direction or in the other will have the effect of modifying the pressure exerted on the diaphragm by the liquid contained within the deformable lens and therefore the distance e. In point of fact, the focal distance F depends on the thickness e of the lens. There is therefore provided a means for adjusting the thickness e and therefore the focal distance F of the lens. This adjustment can clearly be remote-controlled.

In the event of variation of the ambient temperature, of leakage of liquid, or of accidental variation of the distance e or for any other reason, the follow-up control chain constituted by the elements 3, 15, 14, 16, 17, 9, 7, 6, . . . maintains the distance e at the reference value adopted.

The pulse transmitter 12 excites the transducer 1 and the echos resulting from reflection of the ultrasonic waves emitted within the medium under examination are transmitted via an amplifier 18 to a conventional circuit for processing and utilizing the information contained in these echos.

It is readily apparent that the means for varying the pressure of liquid as described with reference to FIG. 1 could constitute an alternative embodiment. For example, the motor could thus control a jack for regulating the pressure exerted by the liquid.

The two faces of the lens could be constituted by deformable diaphragms and the distance between the two faces could be measured at a point other than the center.

Moreover, it would be possible to consider an alternative embodiment in which the position of the diaphragm 5 is detected by means of echos obtained from pulses emitted by the main transducer 1.

However, the embodiment herein described has the advantage of permitting accurate detection carried out on the maximum thickness of the lens. By way of alternative, the transmission frequency could be independent of the main transmission frequency if so desired. The transmission carrier frequency or in other words the high frequency of oscillations of the transmitter 13 could be within the range of 10 to 20 MHz, for example, in respect of a transmission frequency of the transmitter 12 within the range of 3 to 5 MHz.

It will be noted that the focusing obtained by means of the device of FIG. 1 is usually imperfect, especially in the case of relatively large apertures. The reason for this is that the diaphragm is of uniform thickness and that, under the action of the pressure of the liquid, said diaphragm consequently assumes the shape of a spherical cap whereas the ideal shape for focusing is a hyperboloid of revolution. In order to correct resultant aberrations, consideration could be given to the use of a diaphragm having a non-uniform thickness. However, the calculation of the law of variation in thickness in this case would be complex and strictly accurate correction would be achieved only in respect of a given focus.

It is more advantageous to adopt the alternative embodiment of FIG. 2 which, in order to obtain a correction, calls for the application of a multiple-element transducer associated with independent time and amplitude weighting circuits, as will now be explained.

Figure 2:
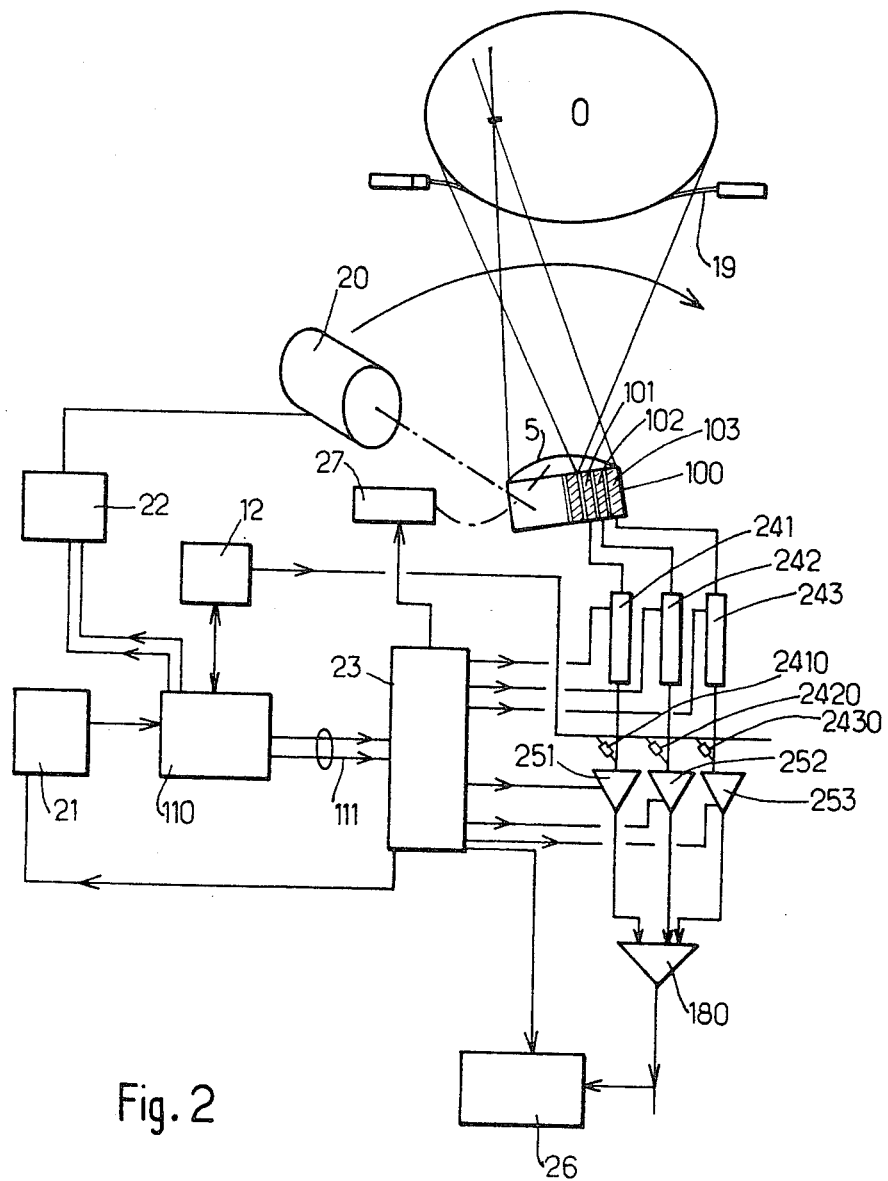
FIG. 2 is a partial schematic illustration of an echography device which makes use of a probe in accordance with a second embodiment.

There is shown in FIG. 2 only that part of the circuits of the device which corresponds to the main transducer as designated by the reference 100 and associated with the diaphragm 5 so as to constitute a lens. The remainder of the device is designed in accordance with FIG. 1. In other words, the transducer 100 is housed within a casing and forms in conjunction with the diaphragm 5 a chamber which is filled with a couplant liquid so as to constitute a convergent lens. Said chamber communicates with a liquid pressure regulating device which is in turn controlled by signals delivered by a circuit for measuring the thickness of the lens, said circuit being provided with an auxiliary measuring transducer.

In FIG. 2, the complete device for adjusting the shape of the lens is represented schematically by a rectangle 27 coupled to the lens 5 by means of a chaindotted line.

In the alternative embodiment of FIG. 2, the main transducer 100 is preferably designed in the form of a plurality of concentric rings. By way of example, provision can be made for approximately ten rings such as those designated in the figure by the references 101, 102, 103. Said rings are electrically insulated from each other and acoustically independent while being rigidly fixed to a common support in such a manner as to ensure that their active surfaces are located in the same plane which constitutes the flat face of the lens. The description of a multiple-element transducer of this type is given in the French patent cited earlier.

The beam which emerges from the transducer 100 is subjected to an angular scan either by direct action on said transducer or by association of the scanning control device with an oscillating mirror as described for example in French patent application No. 77 35201 filed by the present Applicant on Nov. 23rd, 1977 in respect of: "Echographic inspection apparatus with oscillating mirror for medical diagnosis".

The scanning control device is represented schematically in the figure by a motor 20 coupled to the transducer 100 by a chain-dotted line, and by a circuit 22 for generating a suitable control voltage.

The assembly (100-5) is immersed in a chamber containing a couplant fluid such as water chosen so as to have a velocity of propagation of ultrasonic waves which does not suppress the effect of focusing of the beam by the deformable lens. The drawing shows only the flexible diaphragm 19 which is transparent to ultrasonic waves and closes the coupling chamber on the beam exit face.

The object O to be examined, namely part of a patient's body in the example under consideration, is applied against the diaphragm 19, a film of couplant fluid being preferably interposed between the patient's skin and the diaphragm 19.

A clock generator 21 controls a synchronization circuit 110 which delivers on the one hand synchronization pulses required for the main transmitter 12 and on the other hand the pulses for controlling the circuit 22 which is adapted to supply the motor 20 in such a manner as to ensure that the ultrasonic beam emitted by the transducer 100 is subjected to an angular scan through a predetermined angle during each emission cycle. The design of a circuit of this type is described in the patent application cited earlier.

The synchronization circuit 110 also delivers instructions to a circuit 23 via a bus 111. Said circuit 23 is so arranged as to deliver signals for programming delay lines such as those designated by the references 241 to 243 and programmable-gain preamplifiers such as those designated by the references 251 to 253. Finally, the synchronization circuit transmits to the device 27 a signal for adjusting the principal focusing effect.

The delay lines which are provided in a proportion of one line per annular element of the transducer 100 transmit the signals delivered by the transmitter 12 to said elements via non-return cells indicated by small rectangles 2410, 2420 and 2430. As explained in the patent application cited earlier, said cells are constituted by diodes mounted in top-to-tail relation and prevent the application of the transmission signals to the preamplifiers 251 to 253 and, conversely, the application of the diode signals to the transmitter 12.

The preamplifiers 251 to 253 which are equal in number to the annular elements of the transducer 100 have outputs connected to the input of a receiving summation amplifier 180, the output of which is connected to a memory 26.

By reason of the fact that the signals delivered by the main transmitter 12 are applied during operation to the respective elements of the transducer 100 with different time-delays and in some cases with amplitude weighting suitably programmed by the circuit 23, this accordingly results in a first effect of programmable focusing of the ultrasonic beam emitted by the transducer 100. These emission delays may be dispensed with if necessary.

At the receiving end, the echo signals also undergo weighted delays in delay lines as well as amplitude weighting in the preamplifiers 251 to 253. It has been demonstrated that this amplitude weighting operation makes it possible on the one hand to improve the shape of the reception diagram by reducing its side lobes and on the other hand to modify the relative aperture of the transducer 100 in order to change the ratio between the depth of field l and the diameter d of the focal spot.

The values d and l are determined with respect to each other by the relation $d^2/l = f \cdot k$, where f is the emission frequency. In consequence, if it is desired to have a very sharp image (with a low value of d), the depth of field will be very small, and conversely. It may then prove advantageous to carry out a first general examination with a substantial depth (but low sharpness of image definition) in order to obtain an overall view of the object, then to return to a zone of interest and choose a low depth of field but high sharpness of definition.

These results are obtained very simply by means of the device herein described by modifying the program of adjustment of gains of the preamplifiers 251 to 253 and the adjustment of the device 27.

In regard to the program of adjustment of the delay lines, it should be pointed out that the sole intended function of this program is to carry out a simple correction of aberrations of the principal focusing effect which is provided (as in the embodiment of FIG. 1) by the deformable lens 5 and the associated circuit 17.

The focusing effect could conceivably have been provided entirely by means of the multiple-element transducer 100 associated with the delay lines 241 to 243. However, in the case of a relative aperture of the transducer 100 of the order of 0.5, this solution results in a design of transducer having at least one hundred elements and in the application of substantial time-delays. It is for this reason that the device herein described proposes to carry out the principal adjustment by means of a deformable lens associated with a circuit for controlling the position of the lens diaphragm and to employ the multiple-element transducer solely in order to obtain small variations for correcting the aberrations of the deformable lens. In that case a small number of elements is sufficient and the transducer 100 can be constructed without difficulty.

The circuit 23 makes it possible to modify the programs of adjustment of time-delays, of gains, of the reference value imposed by the circuit 27, of the rate and amplitude of scanning imposed by the circuit 21 as a function of the application which is contemplated.

Said circuit can be so arranged so as to obtain a number of successive focusing adjustments corresponding to the formation of successive images of a number of separate zones of the object to be examined. Transition from one zone to the next can be performed automatically at a high rate of several transitions per second. The echo signals will then be written in separate regions of the memory 26 for general processing of said signals and consequently for the purpose of forming a single high-definition image at all depths.

The time and amplitude weighting circuits also make it possible to displace the position of the focal spot about a mean value within a limited range and if necessary to carry out within this zone, at the receiving end, dynamic focusing as described in French Pat. No. 73 41921.

I claim:

1. An ultrasonic echographic probe having a deformable acoustic lens and comprising a main piezoelectric transducer associated with an acoustic lens constituted by a chamber filled with a liquid and having a first face delimited by the active face of the transducer and a second curved face constituted by a deformable diaphragm, wherein said probe comprises means for varying the pressure of the liquid on the diaphragm as a function of a control signal, an electroacoustic means for measuring the thickness of the lens by reflection of ultrasonic pulses, and means for comparing the thickness-measuring signal generated by said electroacoustic means with a signal which is representative of a reference value in order to generate a difference signal which constitutes said control signal.

2. A probe according to claim 1, wherein said transducer is annular and wherein said electroacoustic means comprises an auxiliary piezoelectric transducer housed within the central orifice of the main transducer and an auxiliary ultrasonic pulse transmitter associated with an echo receiver adapted to deliver a signal for measuring the thickness of the lens at its apex.

3. A probe according to claim 1 or claim 2, wherein said pressure-varying means comprises a capsule adapted to communicate with said chamber and closed by an elastic diaphragm, said diaphragm being subjected to the action of a piston driven by an electric motor by means of a toothed wheel disposed in cooperating relation with a toothed rack provided on the piston rod.

4. A probe according to claim 2, wherein said auxiliary transmitter has a substantially higher carrier frequency than the carrier frequency adopted for the excitation of the main transducer.

5. A probe according to claim 1, wherein said main transducer comprises a plurality of piezoelectric elements which are electrically insulated and acoustically independent from each other, said elements being associated so as to form a common active surface which constitutes the first face of the lens, wherein the main receiver associated with said transducer is connected to said transducer elements by means of phase and amplitude weighting circuits which are adjustable independently of each other and wherein means are provided for carrying out the programmed adjustment of said circuits and of said reference value.

6. A probe according to claim 5, wherein said piezoelectric elements are annular.

7. A probe according to claim 5 or claim 6, wherein said programmed adjustment means is adapted to obtain successively a plurality of values of focusing distance and of depth of field of the probe and a corresponding plurality of successive object-scanning zones, a memory element being provided for recording the results of examination within said successive zones.

* * * * *